US006343590B1

(12) United States Patent
Nagai et al.

(10) Patent No.: US 6,343,590 B1
(45) Date of Patent: Feb. 5, 2002

(54) CANISTER MODULE

(75) Inventors: Takashi Nagai; Kazumi Haruta, both of Ohbu (JP)

(73) Assignee: Aisan Kogyo Kabushiki Kaisha, Ohbu (JP)

( * ) Notice: Subject to any disclaimer, the term of this patent is extended or adjusted under 35 U.S.C. 154(b) by 0 days.

(21) Appl. No.: 09/605,985

(22) Filed: Jun. 29, 2000

(30) Foreign Application Priority Data

Jul. 8, 1999 (JP) .......................................... 11-228814

(51) Int. Cl.[7] .............................. F02M 3/02; F16T 1/20
(52) U.S. Cl. ......................... 123/518; 123/519; 137/43; 137/202
(58) Field of Search .................. 137/43, 202; 123/516, 123/518, 519

(56) References Cited

U.S. PATENT DOCUMENTS

| 5,518,018 A | * | 5/1996 | Roerker .......................... 137/43 |
| 5,535,772 A | * | 7/1996 | Roetker et al. ................ 137/202 |
| 5,666,989 A | * | 9/1997 | Roetker .......................... 137/43 |
| 5,694,968 A | * | 12/1997 | Devall et al. ................ 137/202 |
| 5,782,258 A | * | 7/1999 | Herbon et al. .............. 137/202 |
| 5,975,116 A | * | 11/1999 | Rosas et al. .................. 137/43 |

FOREIGN PATENT DOCUMENTS

JP        7-293382        11/1995

* cited by examiner

*Primary Examiner*—Thomas N. Moulis
(74) *Attorney, Agent, or Firm*—Pillsbury Winthrop LLP

(57) ABSTRACT

In order to reduce a discharge amount of an evaporated fuel to the atmosphere and make it possible to manufacture an automobile in accordance with a module production, in a canister module, a fill check valve, a cut off valve, a positive and negative pressure check valve and the like are previously assembled in a module main body in an integral manner and the canister module is covered with a cover portion of a canister case having an absorbent storage chamber on an evaporated fuel outlet side and the cover portion is welded to a module main body so as to keep an airtight condition, thereby forming a passage portion surrounded by the cover portion and the module main body. Accordingly, a rubber hose is omitted and a transmitting amount of the evaporated fuel to the atmosphere is reduced.

3 Claims, 6 Drawing Sheets

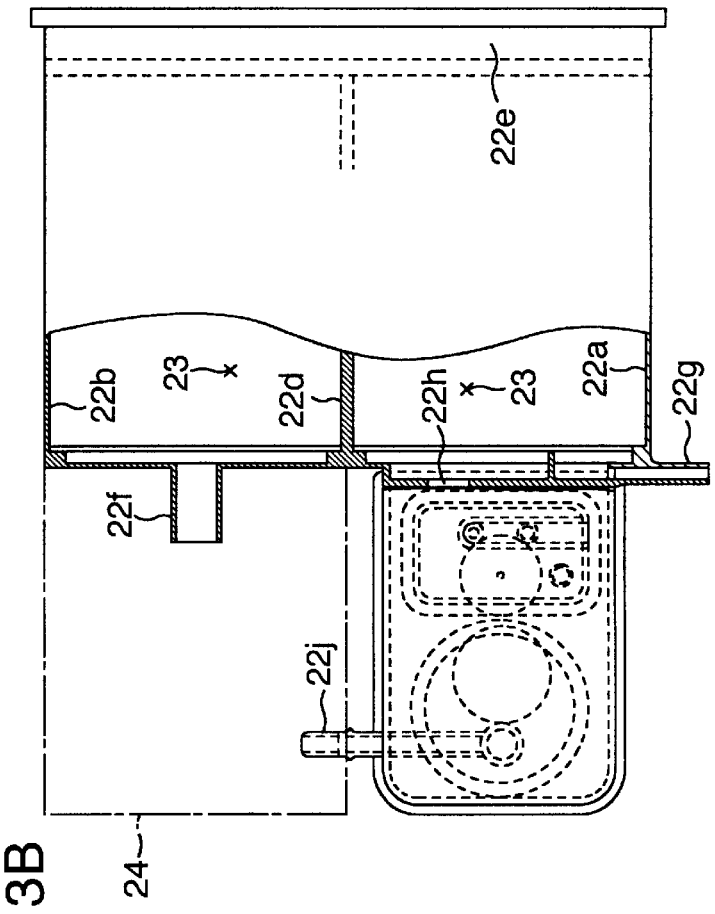
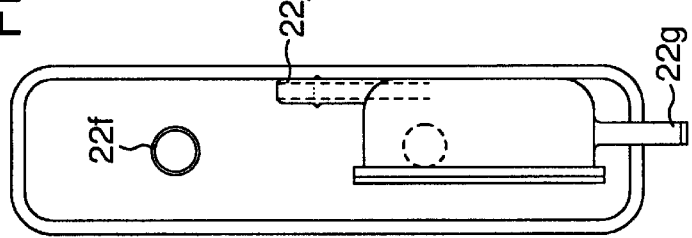

CANISTER MODULE

FIELD OF THE INVENTION

The present invention relates to an apparatus for treating evaporated fuel for an internal combustion engine, and more particularly, to a canister module with integrated components.

RELATED ART

Conventionally, an evaporated fuel treatment apparatus in a fuel system of an internal combustion engine is structured, as shown in FIG. 6, such that a fill check valve 20' and a cut off valve 30' are secured to a topmost portion of a fuel tank 41 via grommets 42 and 43 and connected to a canister 44 provided in another place by rubber hoses 45 and 46, and a purge pipe 44a of the canister 44 is connected to a suction pipe 51 on an upstream side of a throttle valve 49 via a vacuum control valve (VCV) 48 opened and closed in accordance with a computer control on the basis of an electric signal from an electric control unit (ECU) 47, whereby an evaporated fuel collected at a time when a rotation of an engine increases is sucked due to a negative pressure in the suction pipe 51 and is burned.

In the fill check valve 20', since a fuel vapor pressure within the fuel tank 41 is increased at a time of supplying a fuel, a diaphragm 2 is lifted up against a diaphragm spring 4, a diaphragm valve 20a is opened, and the evaporated fuel within the fuel tank 41 flows as shown by an arrow and is adsorbed to the canister 44. Since a float valve body 7 is submerged in the fuel when the fuel tank is filled with the fuel, the float valve body 7 floats due to a buoyancy and closes a float valve seat 6, a float valve 7a is closed and a stream of the evaporated fuel is shut off.

Further, the cut off valve 30' corresponds to an open/close valve for preventing the fuel within the fuel tank 41 from flowing out to an outside via the canister 44 when a vehicle rolls sideways, and is structured such that a cut off valve body 18 is brought into contact with a cut off valve seat 30c due to urging of a cut off valve spring 19 so as to close the cut off valve 30' when the vehicle rolls sideways. Further, the cut off valve 30' is provided with a positive pressure safety valve 30b for reducing the pressure within the fuel tank 41 if the cut off valve body 18 should attach to the cut off valve seat 30c.

On the contrary, a positive and negative pressure check valve 40' provided within the canister 44 corresponds to an open/close valve for reducing the pressure within the fuel tank 41. This valve is structured such that when an inside of the fuel tank 41 is cooled and the pressure is educed, a negative pressure check valve 40d opens so as to return the pressure and when the pressure within the fuel tank is increased, a diaphragm 40c is lifted up so as to open a diaphragm valve and to reduce the pressure, thereby preventing the fuel tank 41 from being broken.

Accordingly, the rubber hoses 45 and 46 are always filled with the evaporated fuel, and the evaporated fuel is slightly discharged to the atmosphere through a rubber material of the rubber hoses 45 and 46 due to the pressure increase within the fuel tank 41. In particular, since the rubber hose 45 for connecting the fill check valve 20' to the canister 44 has a large diameter so as to reduce a flow path resistance, a discharge area is great and a discharge amount of the evaporated fuel is large. These discharge amounts are not in problem in the case that an onboard refueling vapor recovery regulation is not so severe, however, when the regulation becomes more severe, even a slight discharge amount is in problem. Further, there is a strong desire that the parts should be integrated for a recent module production and should be made a module corresponding to reduction of the number of parts for reducing cost. Accordingly, an object of the present invention is to provide a canister module which can reduce a discharge amount of the evaporated fuel to the atmosphere and can be manufactured in accordance with a module production.

SUMMARY OF THE INVENTION

In order to achieve the object mentioned above, in accordance with a first aspect of the present invention, there is provided a canister module comprising:

at least one open/close valve opening or closing due to a pressure within a fuel tank or a buoyancy from a fuel and opening and closing a passage connecting the fuel tank and an absorbent storage chamber, the open/close valve being assembled in a module main body so as to form a valve module; and a cover portion for covering a cover side of the open/close valve of the valve module so as to keep an airtight condition of a bonding portion, thereby forming a passage portion for an evaporated fuel by the cover portion and the module main body.

Further, the structure may be made such that at least a fill check valve of the open/close valve is assembled in the module main body so as to form the valve module. Still further, the cover for the open/close valve assembled in the module main body may be integrally formed with the cover portion of the canister case, whereby it is possible to omit the cover for the open/close valve.

In accordance with a second aspect of the present invention, there is provided a canister module comprising:

a diaphragm valve chamber provided in a module main body and communicated with a float valve;

a valve chamber provided within the diaphragm valve chamber and arranged apart from the diaphragm valve chamber;

a positive pressure check valve, a negative pressure check valve, a positive pressure safety valve and a cut off valve, each having one opening portion disposed within the valve chamber;

a diaphragm valve seat provided in a center of the diaphragm chamber and used for opening and closing a passage;

a diaphragm brought into contact with the diaphragm valve seat due to a pressing force of an elastic member;

a diaphragm cover surrounding the diaphragm in such a manner as to keep an airtight condition and having an opening for introducing a pressure in the diaphragm chamber to an outside; and a communication hole for communicating the valve chamber with the passage, wherein an outer end portion of the passage is connected to the canister in such a manner as to keep an airtight condition, and the module main body is engaged with a fuel tank in such a manner as to keep an airtight condition.

BRIEF DESCRIPTION OF THE DRAWINGS

FIGS. 2A to 2C are schematic views of a valve module in accordance with a first embodiment of the present invention, in which FIG. 2A is a top view, FIG. 2B is a side partly sectional view and FIG. 2C is a front sectional view;

FIGS. 3A to 3C are schematic views of a canister module in accordance with the first embodiment of the present invention, in which FIG. 3A is a side view, FIG. 3B is a top partly sectional view and FIG. 3C is a front sectional view;

FIGS. 5A to 5E are schematic views of a canister module in accordance with a third embodiment of the present invention, in which FIG. 5A is a top view, FIG. 5B is a front sectional view, FIG. 5C is a top view of a diaphragm valve chamber, FIG. 5D is a cross sectional view taken along a line VD—VD in FIG. 5A, and FIG. 5E is a cross sectional view taken along a line VE—VE in FIG. 5A.

DESCRIPTION OF THE PREFERRED EMBODIMENT

Figure 2A:
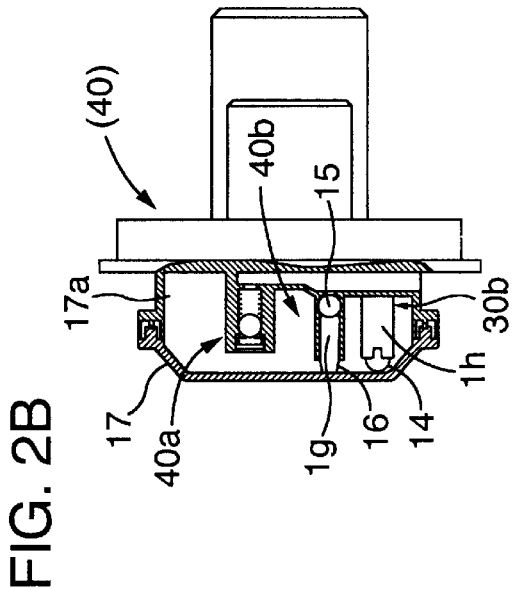
Figure 2B:
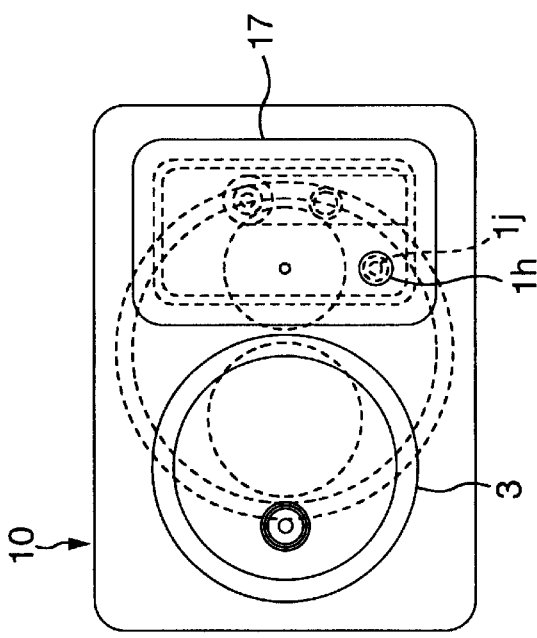
Figure 2C:
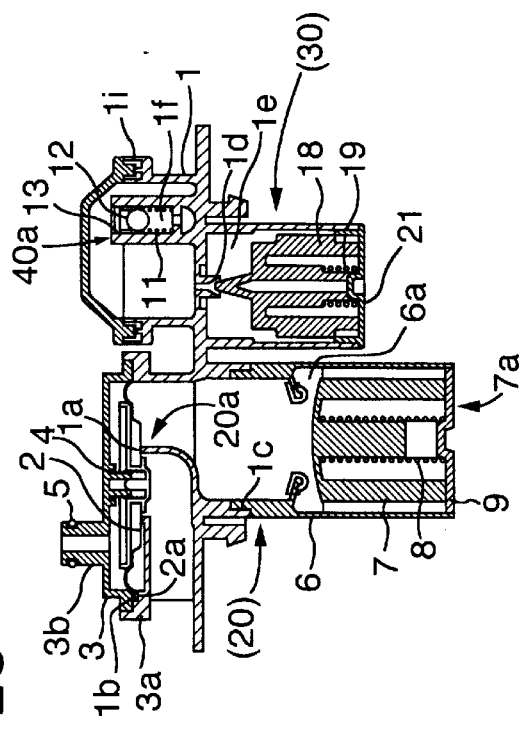

A description will be given of a first embodiment in accordance with the present invention with reference to the accompanying drawings. FIGS. 2A to 2C are respectively a top view, a side sectional view and a front sectional view of a valve module. In FIGS. 2A to 2C, a diaphragm valve seat 1a, a diaphragm seal portion 1b, a float valve seat connecting portion 1c, a cut off valve seat 1d, a cut off valve chamber 1e, a positive pressure check valve chamber 1f, a negative pressure check valve seat 1g, a positive pressure safety valve seat 1h and a check valve cover welded portion 1i are integrally formed with a resin module main body 1. An outer peripheral bead 2a of a diaphragm 2 is fitted onto the diaphragm seal portion 1b, and is held between a diaphragm cover 3 and the diaphragm seal portion 1b, and a bonding portion 3a is welded and fixed, thereby keeping an airtight condition. A diaphragm spring 4 is assembled between the diaphragm 2 and the diaphragm cover 3, and the diaphragm 2 is pressed to the diaphragm valve seat 1a so as to constitute a diaphragm type open/close valve 20a. A cylindrical engaging portion 3b is provided in an upper portion of the diaphragm cover 3 and an O-ring 5 is mounted to a distal end portion thereof for keeping an airtight condition. A float valve seat 6 is connected to the float valve seat connecting portion 1c and is secured thereto by welding or bonding. A float valve body 7 is inserted below the float valve seat 6, a float valve cover 9 is snap fixed to a lower end of the float valve seat 6 via a float valve spring 8 so as to constitute a float valve chamber 6a, and a float valve 7a is constituted thereby. A fill check valve 20 is constituted by cooperating the above elements with the diaphragm type check valve 20a.

A positive pressure check valve spring 11 and a positive pressure check ball 12 are inserted in the positive pressure check valve chamber 1f and a positive pressure check valve seat 13 is forced into the chamber, whereby a positive pressure check valve 40a is constituted. A check ball (not shown) and a safety valve spring 14 are mounted on the positive pressure safety valve seat 1h, a negative pressure check ball 15 and a negative pressure check valve spring 16 are mounted on the negative pressure check valve seat 1g, and a check valve chamber cover 17 is welded to the check valve cover weld portion 1i so as to hold one end of the safety valve spring 14 and the negative pressure check valve spring 16 and to form a liquid storage chamber 17a. In this case, an inlet port 1j of the positive pressure safety valve 1h is provided at a position open to an inner portion of the fuel tank. A cut off valve body 18 is inserted in the cut off valve chamber 1e, and a cut off valve chamber cover 21 is snap fixed thereto via a cut off valve spring 19 so as to constitute the cut off valve chamber 1e. The cut off valve chamber 1e and the positive pressure safety valve 30b cooperate with each other so as to constitute a cut off valve 30, and the positive pressure check valve 40a and the negative pressure check valve 40b constitute a positive and negative pressure check valve 40. Accordingly, the valve module 10 is constituted. These fill check valve 20, the cut off valve 30 and the positive and negative pressure check valve 40 have the same functions as those of the fill check valve 20' the cut off valve 30' and the positive and negative pressure check valve 40'.

Next, a description will be given of a structure of a canister case 22 assembled in the valve module 10 with reference to FIGS. 3A to 3C. In FIGS. 3A to 3C, a resin canister case 22 is constituted by absorbent storage chambers 22a and 22b for storing an absorbent 23 and a cover portion 22c for surrounding the valve module 10. The absorbent 23 is charged into the absorbent storage chambers 22a and 22b. Two absorbent storage chambers 22a and 22b are apart from each other by a wall 22d and communicated with each other at an end portion 22e. An atmosphere pipe 22f is provided in one absorbent storage chamber 22b, and a purge pipe 22g and an evaporated fuel introduction port 22h are provided in another absorbent storage chamber 22a. A cylindrical engaging portion 22i for engaging with an engaging portion 3b provided in the diaphragm cover 3 is provided in the cover portion 22c, and is structured such as to keep an airtight condition via the O-ring 5. A pipe 22j is provided in the cylindrical engaging portion 22i, and a passage communicating with the diaphragm chamber 3c is formed therein. A filter assembly 24 for filtering dusts can be attached to an outer side of the atmosphere pipe 22f. The cover portion 22c of the canister case 22 covers the valve module 10 and is welded at the bonding portion 10a so as to keep an airtight condition. The engaging portion 22i of the canister case 22 is engaged with the engaging portion 3b of the diaphragm cover 3 via the O-ring 5 so as to keep an airtight condition.

Figure 1:
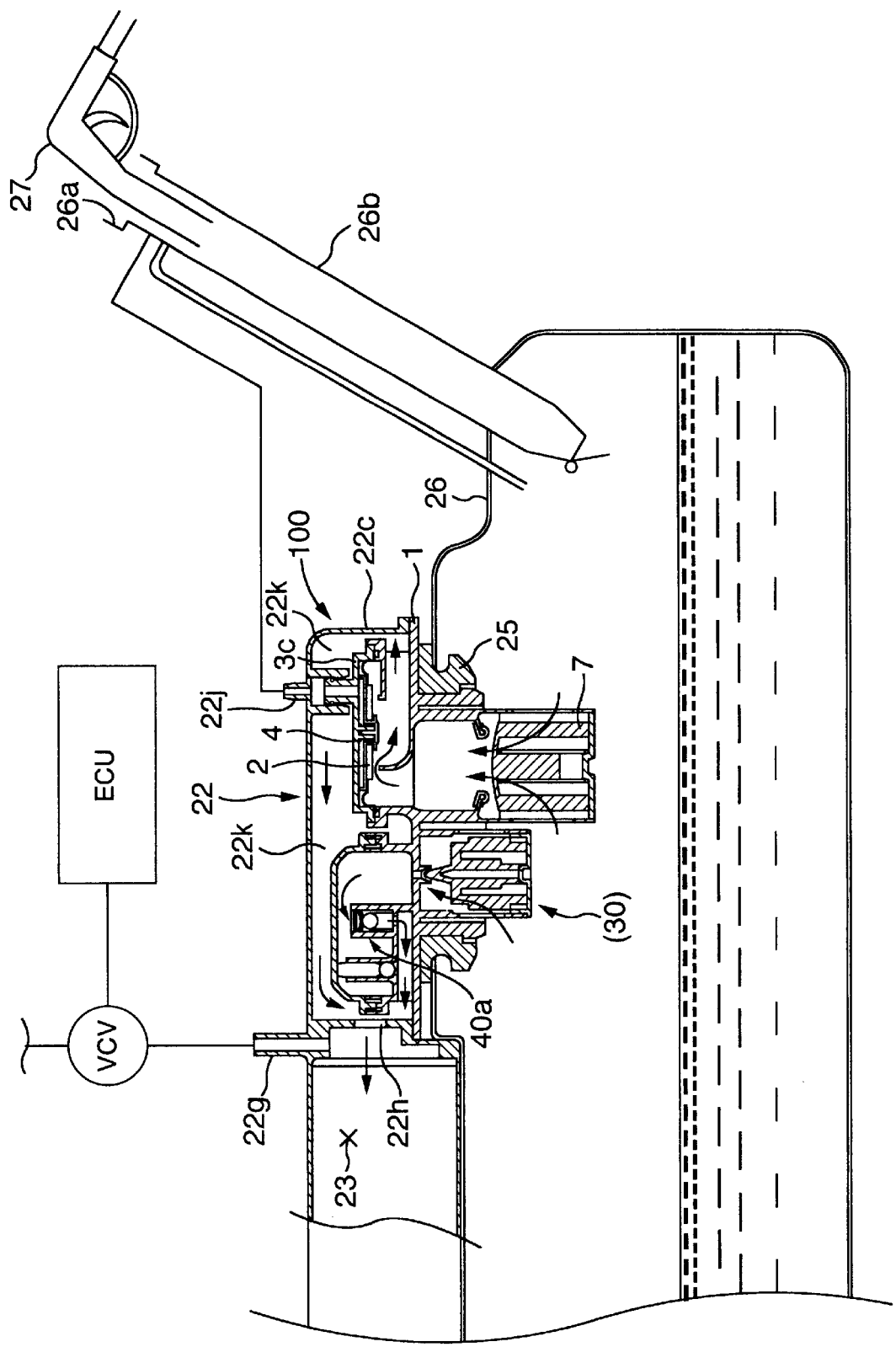
FIG. 1 is a cross sectional schematic view of an evaporated fuel treatment apparatus using a canister module in accordance with the present invention.

Next, a description will be given of an operation of the present embodiment with reference to FIG. 1. FIG. 1 shows a state that the canister module 100 in accordance with the present invention is attached to an upper portion of a fuel tank 26 via a rubber grommet 25 and a fuel is charged from an oil supply port 26a of the fuel tank 26. In this case, a direction of mounting the pipes (the diaphragm chamber pipe 22j and the purge pipe 22g) in FIG. 1 is different from that of the embodiment mentioned above for convenience of explanation. In FIG. 1, since a pressure within the fuel tank 26 is increased due to a vapor pressure of the charged fuel when the fuel is charged from the oil supply nozzle 27, the vapor pressure is applied to the diaphragm 2, the diaphragm 2 is lifted up against the diaphragm spring 4 and the diaphragm valve 20a is released. The evaporated fuel within the fuel tank 26 passes through the float valve 7a and the diaphragm valve 20a, flows out to a passage portion 22k formed by the cover portion 22c and the module main body 1 as shown by an arrow, and is absorbed to the absorbent 23 through the evaporated fuel introduction port 22h.

Figure 6:
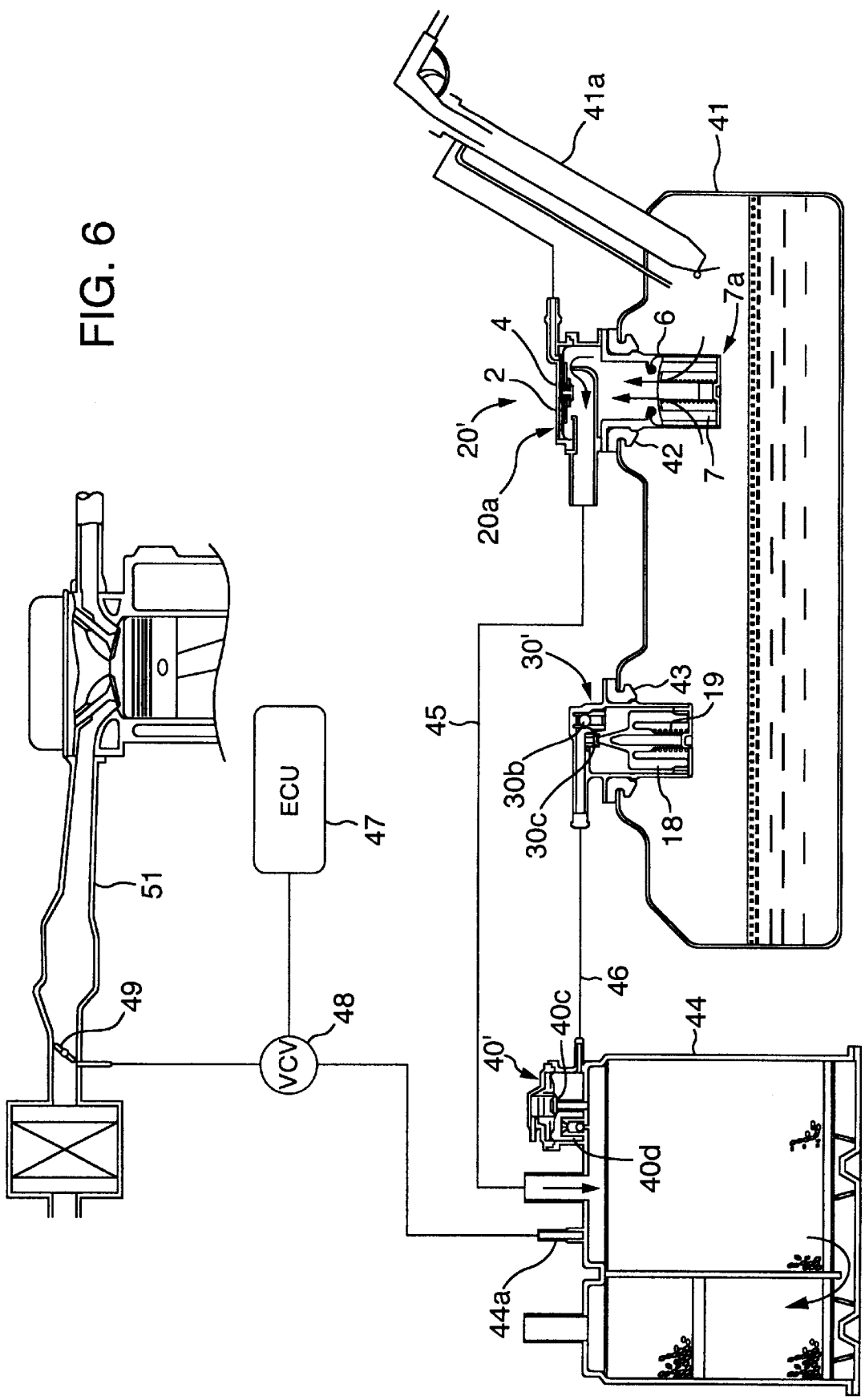
FIG. 6 is a cross sectional schematic view which shows an evaporated fuel treatment apparatus in accordance with a conventional art.

Since the passage portion 22k in which the evaporated fuel flows through is covered by the resin material, an amount of the evaporated fuel leaking out to the atmosphere after the evaporated fuel passing through the resin can be greatly reduced in comparison with the rubber material. Further, the evaporated fuel passing through the cut off valve 30 flows out to the passage portion 22k as shown by an arrow after pressing and opening the positive pressure check valve 40a, and is absorbed to the absorbent 23 via the evaporated fuel introduction port 22h. Since the passage portion 22k is covered by the resin material as mentioned above, an amount of the evaporated fuel leaking out to the atmosphere by passing through the resin can be greatly reduce in comparison with the rubber material. In this case, all of the open/close valves are not necessarily assembled in the module main body 1 in a previous manner. For example, the structure may be made such that only the fill check valve 20 is assembled as described above in place of the conventional art fill check valve 20' (refer to FIG. 6), which has a large flow passage area of the rubber hose 45 (refer to FIG. 6), and the other open/close valves 30, 40 are directly attached to the fuel tank 26 via the grommet 43 (refer to FIG. 6) in the same manner as that of the conventional art. This structure is obviously advantageous due to the integration of the fill check valve 20 with the module main body 1.

Figure 4:
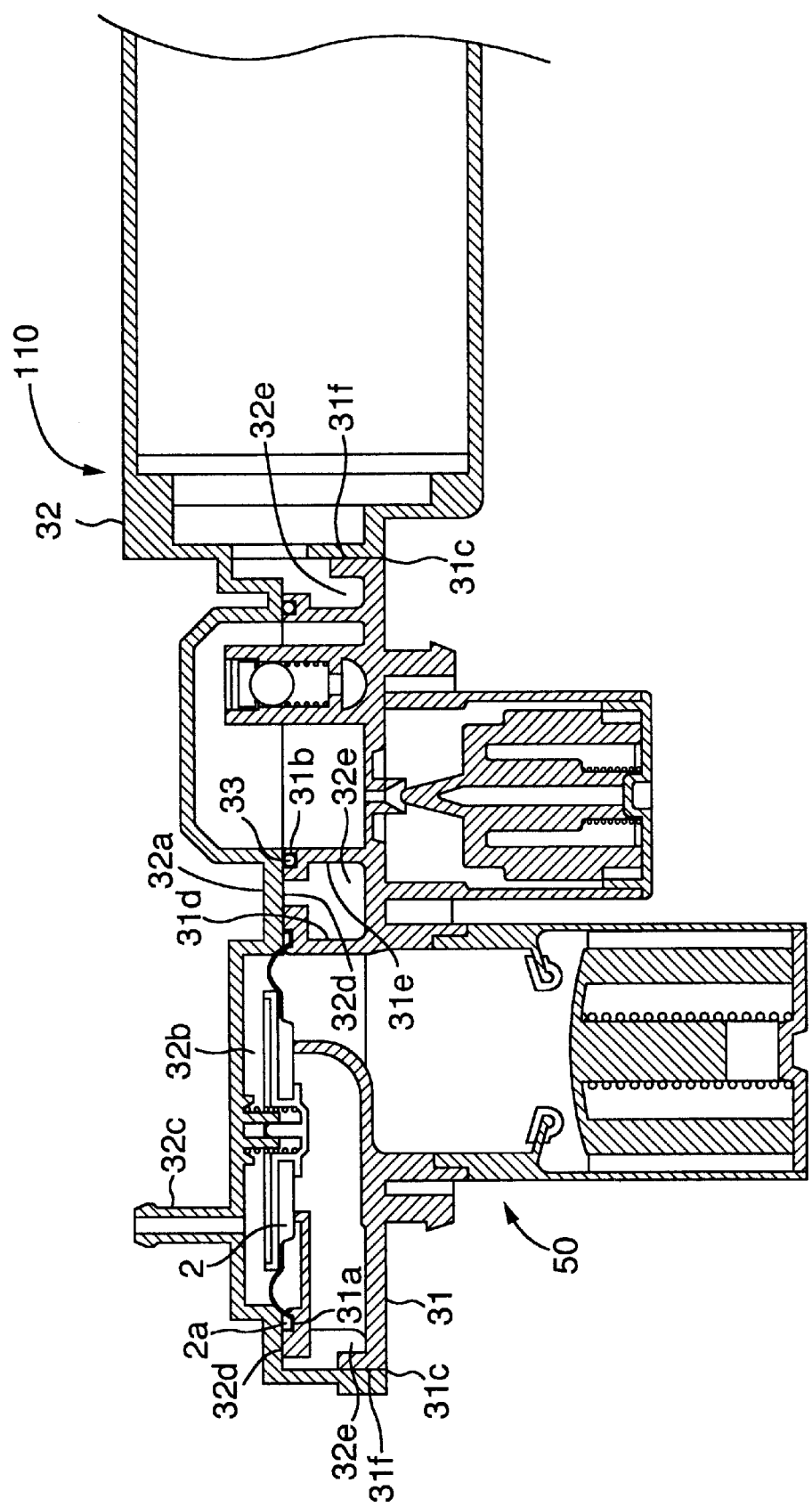
FIG. 4 is a cross sectional view of a canister module in accordance with a second embodiment of the present invention.

Next, a description will be given of a canister module 110 in accordance with a second embodiment of the present invention with reference to FIG. 4. In FIG. 4, the diaphragm cover 3 and the check valve chamber cover 17 in FIG. 3 are integrally formed by a cover portion 32a of a canister case 32, a pipe 32c communicating a diaphragm chamber 32b with the oil supply port 26a (refer to FIG. 1) is provided in a portion corresponding to the diaphragm cover 3, the bead portion 2a of the diaphragm 2 is pressed by a pressing surface 32d and a diaphragm seal portion 31a, an O-ring 33 is pressed by the pressing surface 32d and a check valve chamber seal portion 31b, and a bonding portion 31c is welded in a pressing state. With respect to an operation of the present embodiment, since the pipe 32c is connected to the oil supply port 26a, a negative pressure at a time of supplying an oil is directly transmitted to the diaphragm chamber 32b and a fill check valve 50 operates in the same manner as that of the first embodiment. Further, since a passage portion 32e to which the evaporated fuel is introduced by the cover portion 32a and the module main body 31 is formed in an outer side of the diaphragm valve chamber wall 31d and the check valve chamber wall 31e in the same manner as that of the first embodiment, the same operation is performed. In this case, in order to more completely keep an airtight condition of the bonding portion 31c, it is further effectively achieved by attaching an O-ring (not shown) to a bonding surface 31f.

Figure 5C:
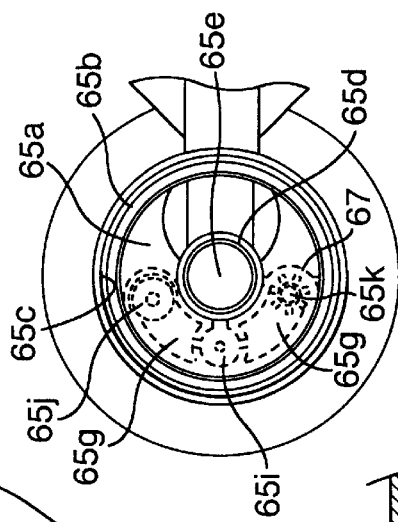
Figure 5A:
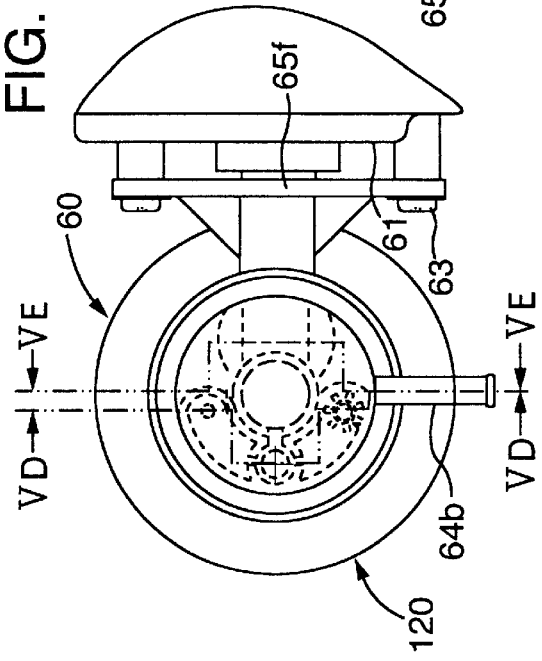
Figure 5B:
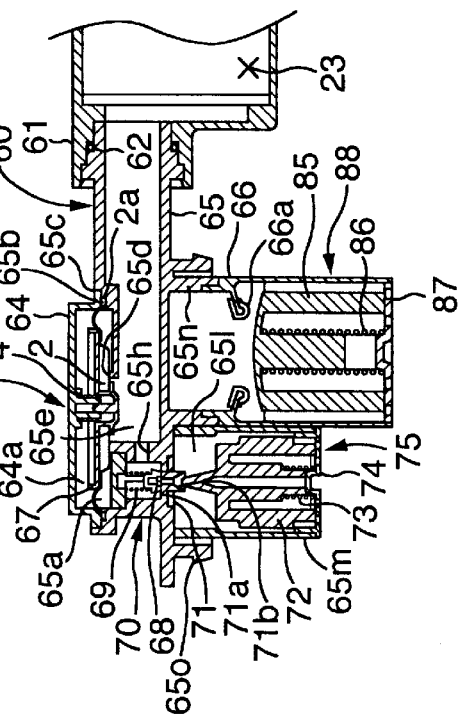
Figure 5D:
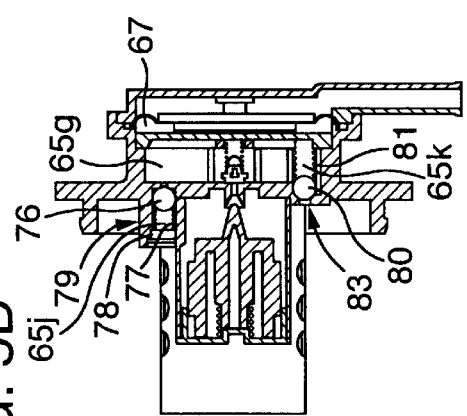
Figure 5E:
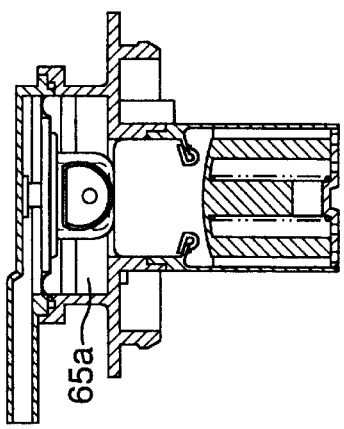

Next, a description will be given of a canister module 120 in accordance with a third embodiment of the present invention with reference to FIGS. 5A to 5E. FIG. 5A is a top view of a canister module, FIG. 5B is a front sectional view, FIG. 5C is a top view of a diaphragm valve chamber, FIG. 5D is a cross sectional view taken along a line VD—VD in FIG. 5A and FIG. 5E is a cross sectional view taken along a line VE—VE in FIG. 5A. A valve module 60 is snap fixed to a canister 61 installing the absorbent 23 therein with keeping an airtight condition by means of an O-ring 62, and is fastened and fixed thereto by a plurality of screws 63. The valve module 60 is constituted by a module main body 65, a diaphragm cover 64 and a floating valve seat portion 66. A diaphragm valve chamber 65a is provided in the resin module main body 65, a diaphragm seal portion 65b is cut on an upper surface thereof, and a bonding portion 65c to the diaphragm cover 64 is provided in an outer periphery thereof. A diaphragm valve seat 65d is provided in a center of the diaphragm valve chamber 65a, and a center passage 65e thereof is structured such as to be communicated with the canister 61. A flange portion 65f for being fixed to the canister 61 is provided in an outer end portion of the passage 65e. A valve chamber 65g is further provided within the diaphragm valve chamber 65a in such a manner as to be shut so as not to communicate with the diaphragm valve chamber 65a, and a valve chamber cover 67 is welded onto an upper surface of the valve chamber 65g, whereby an airtight condition is kept. A communication hole 65h for communicating the passage 65e with the valve chamber 65g is pieced in the diaphragm valve seat 65d.

A positive pressure valve chamber 65i, a negative pressure valve chamber 65j and a positive pressure safety valve chamber 65k are provided within the valve chamber 65g. In the positive pressure valve chamber 65i, a positive pressure check valve 70 is constituted by a positive pressure valve body 68 and a spring 69 having one end being brought into contact with a valve chamber cover 67. A valve seat portion 71 having a positive pressure valve seat 71a and a cut off valve seat 71b is provided in a lower portion of the positive pressure valve body 68, and is communicated with a cut off valve chamber 65l. A cut off valve body 72 is assembled in the cut off valve chamber 65l and a cut off valve cover 74 is snap fixed to a cut off valve chamber wall 65m via a spring 73, thereby constituting a cut off valve 75. A check ball 76 is assembled in the negative pressure valve chamber 65j, and a retainer 78 having a passage in a center portion is forced thereinto via a spring 77, thereby constituting a negative pressure check valve 79. A check ball 80 is assembled in the positive pressure safety valve chamber 65k, and constitutes a positive pressure safety valve 83 together with a spring 81 having one end supported to the valve chamber cover 67. Both of the negative pressure check valve 79 and the positive pressure safety valve 83 are open to the valve chamber 65g and a fuel tank (not shown). The positive pressure check valve 70 is structured such that one is open to the valve chamber 65g and another is open to the fuel tank 26 (refer to FIG. 1) via the cut off valve 75.

On the contrary, the bead portion 2a of the diaphragm 2 in the diaphragm valve 20a is fitted into the diaphragm seal portion 65b and is held between the diaphragm seal portion 65b and the diaphragm cover 64 so as to keep an airtight condition. A spring 4 is mounted between the diaphragm 2 and the diaphragm cover 64 so as to press the diaphragm 2 to the diaphragm valve seat 65d, and the diaphragm cover 64 is welded to the bonding portion 65c. A pipe portion 64b for introducing a pressure of the diaphragm chamber 64a to the outside is provide in the diaphragm cover 64 and is communicated with a portion near the oil supply port 26a (refer to FIG. 1) of the fuel tank 26 (refer to FIG. 1) by a rubber hose (not shown). A float valve seat connecting portion 65n is provided in a lower portion of the diaphragm valve chamber 65a, and the float valve seat portion 66 is welded and fixed to the float valve seal connecting portion 65n. A float valve body 85 is inserted into a lower portion of the float valve seat portion 66, and a float valve cover 87 is snap fixed to a lowermost end of the float valve seat portion 66 via a spring 86, thereby constituting a float valve 88. The float valve 88 constitutes the fill check valve 20 together with the diaphragm valve 20a mentioned above. An engaging portion 65o of the module main body 65 is assembled in the fuel tank 26 (refer to FIG. 1) via the grommet 25 (refer to FIG. 1).

Next, a description will be given of an operation of the present embodiment. When the fuel is started to be supplied, the pressure within the fuel tank 26 is increased due to the vapor pressure of the charged fuel, and the evaporated fuel flows into the diaphragm valve chamber 65a through the float valve 88 and lifts up the diaphragm 2 so as to flow into the passage 65e. The evaporated fuel flowing out to the passage 65e flows into the canister 61 and is absorbed to the absorbent 23. When the fuel tank is filled with the fuel, the float valve body 85 is lifted due to a buoyancy so as to close the float valve seat 66a, thereby preventing the liquid fuel from flowing into the canister 61. Since pressures above and below the diaphragm 2 become equal to each other when the oil supply is completed and a lid of the oil supply port is closed, the diaphragm 2 closes the diaphragm valve seat 65d due to a pressing force of the spring 4, thereby preventing the evaporated fuel from flowing out.

The evaporated fuel within the fuel tank generated due to an increase of the fuel temperature passes through the cut off valve seat 71b, lifts up the positive pressure valve body 68 and is absorbed to the absorbent 23 of the canister 61 via the passage 65e from the communication hole 65h. If the vehicle should roll sideways, the cut off valve body 72 is pressed by the spring 73 so as to close the cut off valve seat 71b, thereby preventing the fuel from flowing out. If the cut off valve body 72 should attach to the cut off valve seat 71b, the positive pressure safety valve 83 opens so as to release the pressure within the fuel tank to the canister 61, thereby preventing the fuel tank 26 from being broken. Further, in the case that the pressure within the fuel tank 26 is reduced due to the drop of the fuel temperature, the negative pressure check valve 79 opens so as to prevent the fuel tank 26 from being broken.

Since the present invention is structured in the manner mentioned above, the following effects can be obtained. That is, in accordance with the first aspect of the present invention, since the rubber hose can be omitted by surrounding at least one of the fill check valve, the cut off valve and the positive and negative pressure check valve, which is previously assembled in the module main body, by the canister cover and welding the bonding portion so as to form the passage portion, it is possible to prevent the evaporated fuel from being discharged to the atmosphere and to reduce the amount thereof. Further, since it is possible to perform a module production, it is possible to reduce steps for assembling the automobile. Further, since at least the fill check valve having the passage with a large transmitting area is applied to an open/close valve previously assembled in the module main body, it is possible to select the most effective construction by striking a balance between a productivity of the module main body and the ORVR regulation value. Still further, in accordance with the present invention, since the diaphragm cover and the check valve chamber cover can be integrally formed with the cover portion of the canister case, it is possible to omit both of the covers and it is possible to reduce cost by reducing the number of parts.

Further, in accordance with the second aspect of the present invention, since one opening portion of each of the positive pressure check vale, the negative pressure check valve, the positive pressure safety valve and the cut off valve is provided in the valve chamber provided within the diaphragm valve chamber, respectively, it is possible to provide a canister module which is compact, has a reduced number of parts and is inexpensive. Further, it is possible to prevent the evaporated fuel from passing through to the atmosphere and to reduce the amount thereof in the same manner as that of the first aspect.

What is claimed is:

1. A canister module, comprising:

at least one open/close valve opening or closing due to a pressure within a fuel tank or a buoyancy of a fuel so as to open or close a passage connecting the fuel tank and an absorbent storage chamber, said open/close valve being assembled in a module main body so as to form a valve module;

a cover portion for covering a cover side of said open/close valve of said valve module so as to keep an airtight condition of a bonding portion, thereby forming a passage portion for an evaporated fuel by said cover portion and said module main body; and wherein said cover portion of the open/close valve assembled in said module main body is integrally formed with a cover portion of a canister case, whereby it is possible to omit a cover for said open/close valve.

2. A canister module, comprising:

at least one open/close valve opening or closing due to a pressure within a fuel tank or a buoyancy of a fuel so as to open or close a passage connecting the fuel tank and an absorbent storage chamber, said open/close valve being assembled in a module main body so as to form a valve module;

a cover portion for covering a cover side of said open/close valve of said valve module so as to keep an airtight condition of a bonding portion, thereby forming a passage portion for an evaporated fuel by said cover portion and said module main body;

wherein at least a fill check valve in said open/close valve is assembled in said module main body so as to form the valve module; and wherein said cover portion of the open/close valve assembled in said module main body is integrally formed with a cover portion of a canister case, whereby it is possible to omit a cover for said open/close valve.

3. A canister module comprising:

a diaphragm valve chamber provided in a module main body and communicated with a float valve;

a valve chamber provided within said diaphragm valve chamber and arranged apart from said diaphragm valve chamber;

a positive pressure check valve, a negative pressure check valve, a positive pressure safety valve and a cut off valve, each having one opening portion disposed within said valve chamber;

a diaphragm valve seat provided in a center of said diaphragm chamber and opening and closing a passage;

a diaphragm brought into contact with said diaphragm valve seat due to a pressing force of an elastic member;

a diaphragm cover surrounding said diaphragm in such a manner as to keep an airtight condition and having an opening portion for introducing a pressure of the diaphragm chamber to an outside; and a communication hole for communicating said valve chamber with said passage, wherein an outer end portion of said passage is connected to the canister in such a manner as to keep an airtight condition, and said module main body is engaged with a fuel tank in such a manner as to keep an airtight condition.

* * * * *